US012687214B2

(12) United States Patent
Kim et al.

(10) Patent No.: US 12,687,214 B2
(45) Date of Patent: Jul. 21, 2026

(54) VIBRATION CONTROL DEVICE AND FREQUENCY-SENSITIVE SHOCK ABSORBER HAVING THE SAME

(71) Applicant: HL Mando Corporation, Pyeongtaek-si (KR)

(72) Inventors: Kyu Do Kim, Seoul (KR); Se Won Cho, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 856 days.

(21) Appl. No.: 17/869,023

(22) Filed: Jul. 20, 2022

(65) Prior Publication Data

US 2023/0358291 A1 Nov. 9, 2023

(30) Foreign Application Priority Data

May 6, 2022 (KR) ........................ 10-2022-0056073

(51) Int. Cl.
*F16F 9/512* (2006.01)
*F16F 9/19* (2006.01)
*F16F 9/36* (2006.01)

(52) U.S. Cl.
CPC .............. *F16F 9/5126* (2013.01); *F16F 9/19* (2013.01); *F16F 9/369* (2013.01); *F16F 2228/04* (2013.01); *F16F 2230/183* (2013.01)

(58) Field of Classification Search
CPC .......... F16F 9/348; F16F 9/5126; F16F 9/512; F16F 9/3482; F16F 9/19; F16F 9/369; F16F 2228/04; F16F 2230/183
See application file for complete search history.

(56) References Cited

U.S. PATENT DOCUMENTS

| | | | | |
|---|---|---|---|---|
| 6,374,967 | B2 * | 4/2002 | Matsumoto | F16F 9/46 188/266.5 |
| 9,206,876 | B2 * | 12/2015 | Yamashita | F16F 9/3485 |
| 9,212,719 | B2 * | 12/2015 | Kim | F16F 9/5126 |

(Continued)

FOREIGN PATENT DOCUMENTS

| | | | | |
|---|---|---|---|---|
| DE | 102015205420 A1 * | 10/2015 | | F16F 9/18 |
| JP | 2018-105378 A | 7/2018 | | |

(Continued)

OTHER PUBLICATIONS

Office Action dated Jan. 2, 2026, for the corresponding Korean Patent Application No. 10-2022-0056073, along with an English machine translation (16 pages).

*Primary Examiner* — Robert A. Siconolfi
*Assistant Examiner* — Mahbubur Rashid
(74) *Attorney, Agent, or Firm* — Hauptman Ham, LLP

(57) ABSTRACT

The present disclosure relates to a vibration control device and a frequency-sensitive shock absorber having the same. A vibration control device includes a sub-piston rod coupled to an end of a piston rod, a pilot valve unit penetrated by and coupled to the sub-piston rod, in which pressure is formed by a fluid introduced through the sub-piston rod, and a fixing member located in a lower portion of the pilot valve unit and fastened to the sub-piston rod to fix the pilot valve unit, wherein the pilot valve unit comprises a free-piston provided to reciprocate in a vertical direction according to a change in the pressure formed by the fluid.

12 Claims, 9 Drawing Sheets

(56)          References Cited

U.S. PATENT DOCUMENTS

| | | | | |
|---|---|---|---|---|
| 9,739,332 B2 * | 8/2017 | Kim | .................... | F16F 9/5126 |
| 2014/0231199 A1 * | 8/2014 | Kim | ........................ | F16F 9/34 |
| | | | | 188/313 |
| 2015/0114774 A1 * | 4/2015 | Kim | .................... | F16F 9/3485 |
| | | | | 188/322.15 |
| 2020/0393015 A1 * | 12/2020 | Kim | .................... | F16F 9/3482 |

FOREIGN PATENT DOCUMENTS

| | | | | | |
|---|---|---|---|---|---|
| KR | 10-2012-0025899 | A | | 3/2012 | |
| KR | 101218836 | B1 * | 1/2013 | | |
| KR | 101227387 | B1 * | 1/2013 | | |
| KR | 20210089457 | A * | 7/2021 | ........... | F16F 9/3481 |

* cited by examiner

VIBRATION CONTROL DEVICE AND FREQUENCY-SENSITIVE SHOCK ABSORBER HAVING THE SAME

CROSS-REFERENCE TO RELATED APPLICATIONS

This application claims the benefit of Korean Patent Application No. 10-2022-0056073 filed on May 6, 2022, in the Korean Intellectual Property Office, the entire disclosure of which is incorporated herein by reference for all purposes.

BACKGROUND

1. Field of the Invention

One or more example embodiments relate to a vibration control device and a frequency-sensitive shock absorber having the same, and more particularly, to a vibration control device capable of controlling damping force for high and low frequencies, respectively, during a tensile stroke of a shock absorber, and a frequency-sensitive shock absorber having the same.

2. Description of the Related Art

In general, a shock absorber is installed in a moving means such as a car to absorb and buffer vibrations or shocks received from a road surface during driving to improve riding comfort.

The shock absorber operates according to the vibration of a vehicle according to road surface conditions. At this time, damping force generated by the shock absorber varies according to an operating speed of the shock absorber.

Depending on how the damping force generated by the shock absorber is adjusted, the ride comfort and driving stability of the vehicle may be controlled. Therefore, when designing the vehicle, it is very important to control the damping force of the shock absorber.

The shock absorber generally includes a cylinder, a piston rod installed to be compressed and expanded in the cylinder, and a piston valve coupled to the piston rod to control the flow of a working fluid. The cylinder and the piston rod are respectively coupled to the body or wheel of the vehicle or the axle of the vehicle.

The piston valve is designed to have a constant damping characteristic at high speed, medium speed and low speed using a single flow path. Therefore, if you want to improve riding comfort by lowering the low-speed damping force, it may affect even the mid-high-speed damping force. In addition, the conventional shock absorber has a structure in which the damping force changes according to the change in the speed of the piston regardless of the frequency or stroke.

As such, the damping force changed according to the speed of the piston generates the same damping force in various road surface conditions, so it may be difficult to satisfy both riding comfort and adjustment stability.

Therefore, it is necessary to research and develop a valve structure for a shock absorber that can simultaneously satisfy vehicle ride comfort and steering stability by varying the damping force according to various road surface conditions.

PRIOR ART DOCUMENT

Patent Document

Japanese Patent Application Laid-Open Publication No. 2018-105378

SUMMARY

Example embodiments provide a vibration control device having improved riding comfort and adjustment stability by controlling damping force for high and low frequencies, respectively, during the tensile stroke of a shock absorber, and a frequency-sensitive shock absorber having the same.

According to an aspect, there is provided a vibration control device including a sub-piston rod coupled to an end of a piston rod, a pilot valve unit penetrated by and coupled to the sub-piston rod, in which pressure is formed by a fluid introduced through the sub-piston rod, and a fixing member located in a lower portion of the pilot valve unit and fastened to the sub-piston rod to fix the pilot valve unit, wherein the pilot valve unit includes a free-piston provided to reciprocate in a vertical direction according to a change in the pressure formed by the fluid.

In addition, the pilot valve unit may further include a first pilot valve body penetrated by and coupled to the sub-piston rod and having pilot chambers formed at upper and lower sides to be filled with the fluid flowing through the sub-piston rod, a second pilot valve body located below the first pilot valve body and penetrated by and coupled to the sub-piston rod, and having a main chamber to be filled with the fluid flowing through the sub-piston rod, and a pilot valve located between the first pilot valve body and the second pilot valve body and elastically deformed according to a pressure change formed by the fluid in the first pilot valve body and the second pilot valve body.

In addition, the first pilot valve body may include a first lower surface, a first upper surface spaced apart from the first lower surface by a predetermined distance, and a first side surface connecting the first lower surface and the first upper surface, and the pilot chamber may include a first pilot chamber concaved by a first predetermined depth in a direction from the first lower surface toward the first upper surface, and a second pilot chamber concaved by a second predetermined depth in a direction from the first upper surface toward the first lower surface.

In addition, the free piston may be provided in the second pilot chamber.

In addition, the first pilot valve body may include a partition surface formed by a predetermined thickness by the first pilot chamber and the second pilot chamber, and a fluid flow path may be formed in the partition surface to pass through along a vertical direction so that the fluid introduced into the first pilot chamber flows into the second pilot chamber.

In addition, the free piston may include a piston body including a third lower surface, a third upper surface spaced apart from the third lower surface by a predetermined distance, and a third side surface connecting the third lower surface and the third upper surface, and a piston chamber concaved by a predetermined depth in a direction from the third upper surface toward the third lower surface.

In addition, the free piston may further include a support protrusion formed to protrude from the third upper surface by a predetermined height.

In addition, the free piston may further include a sealing member groove concaved to a predetermined depth on the third side surface and formed along a circumferential direction, and a sealing member provided in the sealing member groove.

In addition, the free piston may further include a pressure control hole formed to pass through in the vertical direction at any one position of the piston body.

In addition, the pilot valve unit may further include an outlet disk provided on an upper side of the free piston, and the outlet disk may be configured to contact the first upper surface of the first pilot valve body and the support protrusion of the piston body to shield the piston chamber.

In addition, a discharge slit may be formed in the outlet disk to discharge the fluid of the piston chamber when pressure of the first pilot chamber and pressure of the second pilot chamber are unbalanced.

In addition, the fluid filled in the second pilot chamber may flow to the piston chamber through the pressure control hole.

In addition, when the pressure formed in the first pilot chamber and the pressure formed in the second pilot chamber rise higher than pressure formed in the main chamber during a low-frequency tension stroke, the pressure of the pilot valve unit may be adjusted as the fluid in the piston chamber is discharged through the discharge slit.

In addition, when the pressures formed in the first pilot chamber and the pressure formed in the second pilot chamber rise during a high-frequency tension stroke, the pressure of the pilot valve unit may be adjusted as the free piston moves in an upward direction.

According to another aspect, there is provided a frequency-sensitive shock absorber including a cylinder having a fluid stored in its inner space, a piston rod having a part coupled to be located inside the cylinder and reciprocating along a longitudinal direction of the cylinder, a main valve unit coupled to the piston rod and partitioning the inner space of the cylinder into a compression chamber and a tension chamber, a sub-piston rod coupled to a lower end of the piston rod and into which a fluid is introduced from the piston rod, a pilot valve unit penetrated by and coupled to the sub-piston rod, in which pressure is formed by the fluid introduced through the sub-piston rod, and a fixing member located below the pilot valve unit and fastened to the sub-piston rod to fix the pilot valve unit, wherein the pilot valve unit includes a free piston configured to reciprocate in a vertical direction according to a pressure change formed by the fluid.

In addition, the pilot valve unit may further include a first pilot valve body penetrated by and coupled to the sub-piston rod and having pilot chambers formed at upper and lower sides so as to be filled with the fluid introduced through the sub-piston rod, a second pilot valve body positioned below the first pilot valve body and penetrated by and coupled to the sub-piston rod, the second pilot valve body having a main chamber to be filled with the fluid introduced through the sub-piston rod, and a pilot valve positioned between the first pilot valve body and the second pilot valve body, penetrated by and coupled to the sub-piston rod, and elastically deformed according to the pressure change formed by the fluid.

In addition, the pilot chamber may include a first pilot chamber formed below the first pilot valve body and a second pilot chamber formed above the first pilot valve body, and the free piston may be provided in the second pilot chamber.

In addition, the free piston may include a piston chamber formed on an upper side, and a pressure control hole formed through in the vertical direction.

In addition, when pressure formed in the first pilot chamber and the second pilot chamber rises higher than pressure formed in the main chamber during a low-frequency tensile stroke, the pressure of the pilot valve unit may be adjusted as the fluid of the piston chamber is discharged.

In addition, when pressure formed in the first pilot chamber and the second pilot chamber rises during a high-frequency tensile stroke, the pressure of the pilot valve unit may be adjusted as the free piston moves in an upward direction.

Details of other example embodiments are included in the detailed description and drawings.

A vibration control device and a frequency-sensitive shock absorber having the same according to example embodiments have the following effects.

First, during the tension stroke in the low frequency region, a fluid flows smoothly into the pilot chamber and the main chamber, so that pressure is balanced, and the riding comfort may be improved as damping force is generated.

In particular, even when the low-frequency tension stroke is performed in the low-speed driving section, the pressure balance between the pilot chamber and the main chamber is well maintained by the free piston, and it is possible to prevent the adjustment stability (handling performance) from being deteriorated.

Second, when the tensile stroke is performed in the high frequency region, the fluid flows more into the main chamber than the pilot chamber, so that the damping force is reduced due to the pressure imbalance between the pilot chamber and the main chamber, and the riding comfort can be improved.

In particular, even when a high-frequency tension stroke is performed in the middle and high speed driving section, the pressure imbalance between the pilot chamber and the main chamber is well maintained by the free piston, thereby reducing the damping force and improving the riding comfort.

DETAILED DESCRIPTION

Figure 1:
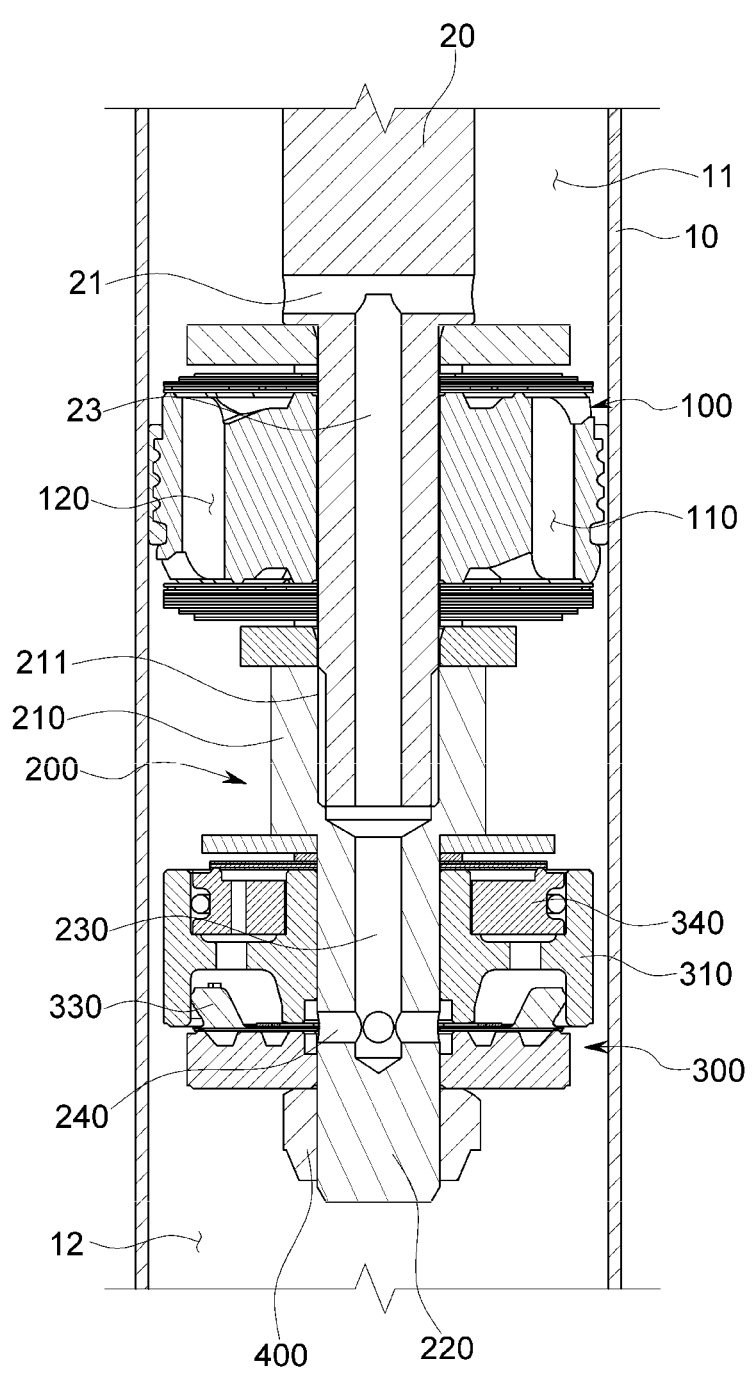
FIG. 1 illustrates a cross-sectional view of a frequency-sensitive shock absorber according to an example embodiment.

Hereinafter, with reference to the accompanying drawings, example embodiments of the present disclosure will be described in detail so that those of ordinary skill in the art to which the present disclosure pertains can easily implement them. The present disclosure may be embodied in many different forms and is not limited to the example embodiments described herein.

It should be noted that the drawings are schematic and not drawn to scale. Relative dimensions and proportions of parts in the drawings are shown exaggerated or reduced in size for clarity and convenience in the drawings, and any dimensions are illustrative only and not limiting. And the same reference numerals are used to indicate like features to the same structural element or part appearing in two or more drawings.

Example embodiments of the present disclosure specifically represent ideal embodiments of the present disclosure. As a result, various modifications of the diagrams are expected. Accordingly, an example embodiment is not limited to a specific shape of the illustrated area, and includes, for example, a shape modification by manufacturing.

Hereinafter, a vibration control device according to the present disclosure and a frequency-sensitive shock absorber having the same will be described with reference to FIGS. 1 to 9.

Figure 2:
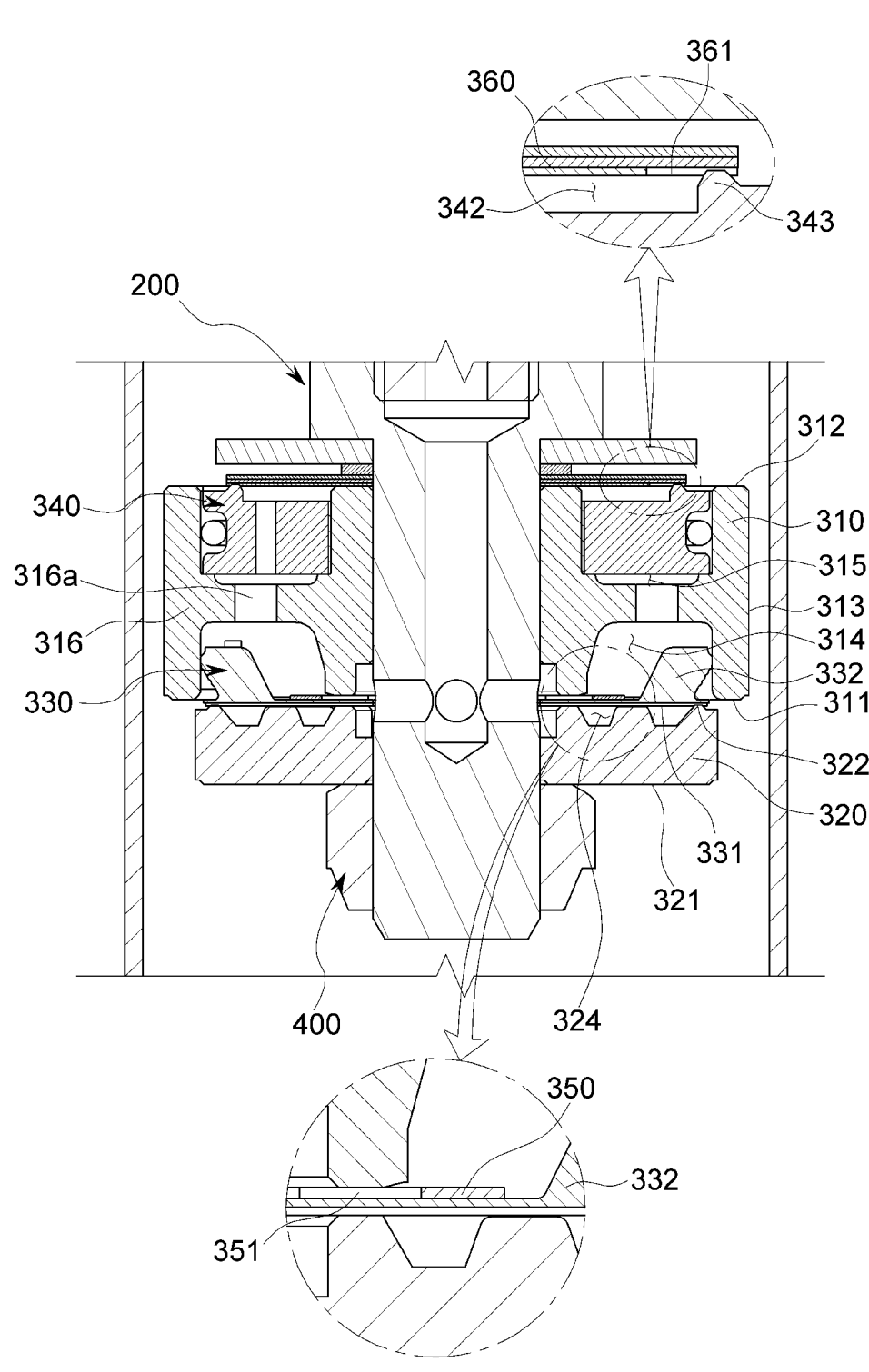
FIG. 2 is a partially enlarged cross-sectional view illustrating a vibration control device of a frequency-sensitive shock absorber according to an example embodiment.
Figure 3:
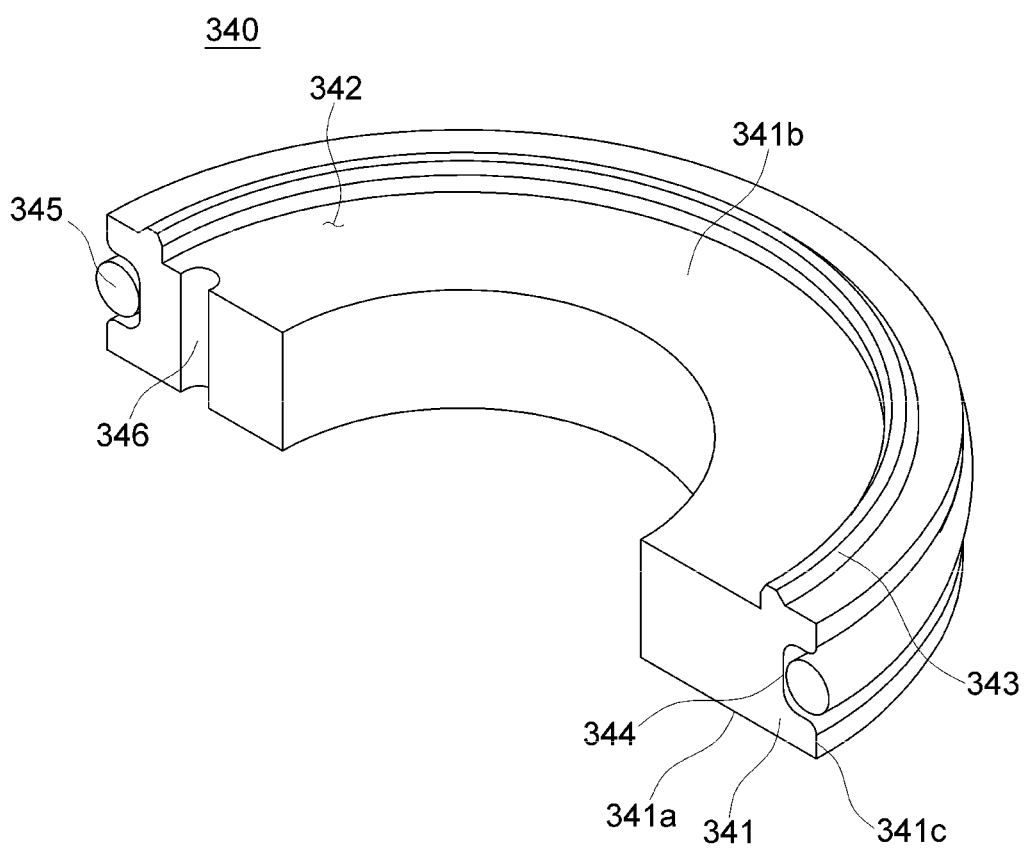
FIG. 3 is a perspective view illustrating a free-piston of a vibration control device according to an example embodiment.
Figure 4:
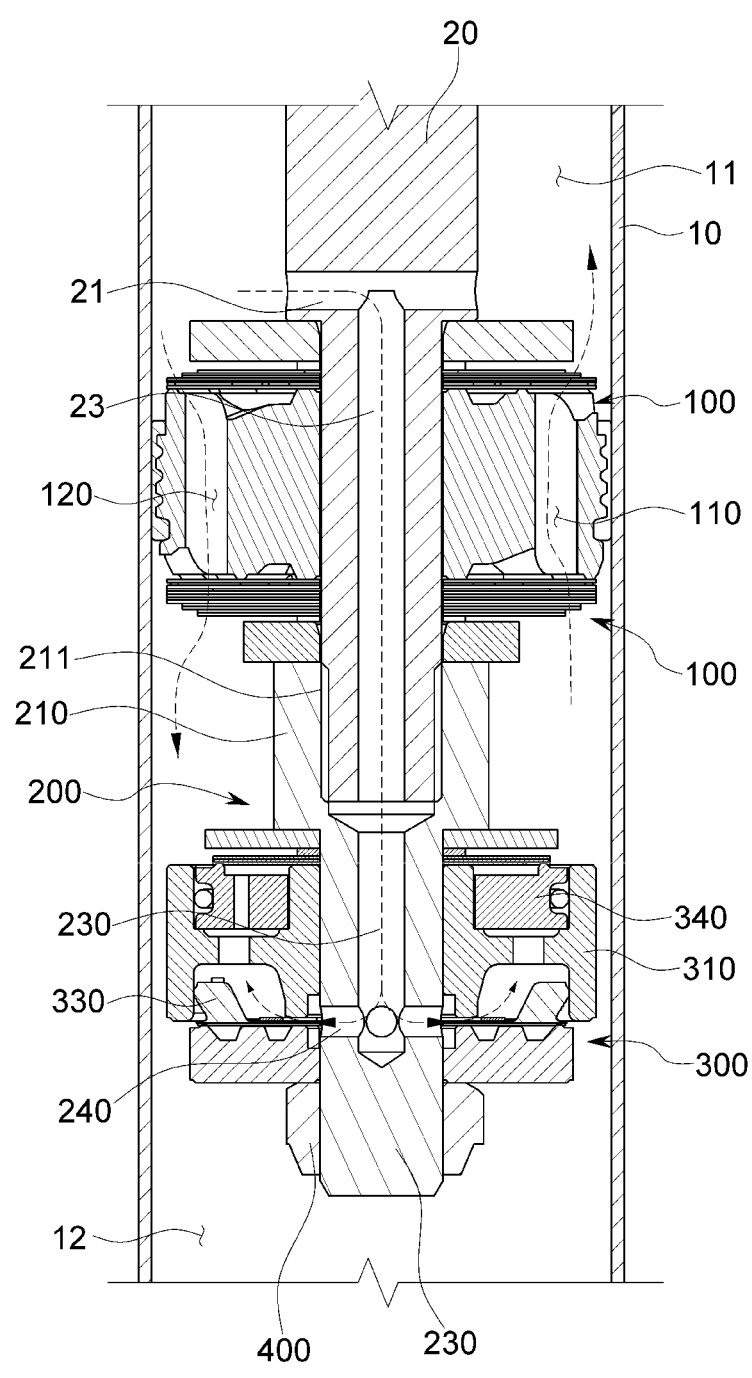
FIG. 4 and FIG. 5 are diagrams illustrating a fluid flow during a low-frequency stroke of a frequency-sensitive shock absorber and a fluid flow in a pilot valve unit according to an example embodiment.

FIGS. 1 to 3 illustrate a frequency-sensitive shock absorber and a vibration control device provided in the shock absorber according to an example embodiment. The frequency-sensitive shock absorber includes a cylinder 10, a piston rod 20, a main valve 100, a sub-piston rod 200, a pilot valve unit 300, and a fixing member 400. Here, the sub-piston rod 200, the pilot valve unit 300, and the fixing member 400 are the vibration control device.

The cylinder 10 is formed in a cylindrical shape having an inner space. The inner space of the cylinder 10 is filled with a fluid (working fluid). The inner space of the cylinder 10 is divided into a tension chamber 11 and a compression chamber 12 by the main valve 100.

The piston rod 20 is coupled to the cylinder 10 such that one side of the piston rod 20 is inserted into the cylinder 10 and the other side is located outside the cylinder 10. Although not specifically shown in the drawings, the other side of the piston rod 20 located outside the cylinder 10 is connected to a vehicle body side or a wheel side. The piston rod 20 coupled to the cylinder 10 reciprocates along the longitudinal direction of the cylinder 10 to perform compression and tension strokes.

The piston rod 20 includes a fluid inflow path 21 and a first fluid flow path 23 as shown in FIG. 1. The fluid inflow path 21 is formed to penetrate in a direction crossing the longitudinal direction of the piston rod 20. The fluid inflow path 21 is formed so that the fluid in the inner space of the cylinder 10 is introduced. In other words, the fluid inflow path 21 is formed so that the fluid in the tension chamber 11 is introduced.

One side of the first fluid flow path 23 communicates with the fluid inflow path 21, and is formed to extend to a lower end of the piston rod 20 in the longitudinal direction of the piston rod 20. The first fluid flow path 23 is a flow path through which the fluid introduced through the fluid inflow path 21 flows.

The fluid filled in the tension chamber 11 and the compression chamber 12 of the cylinder 10 flows into different chambers by the main valve 100 to be described later. On the other hand, in order to generate or reduce the damping force according to the frequency, the fluid in the tension chamber 11 is transferred to the pilot valve unit 300 through the fluid inflow path 21 and the first fluid flow path 23.

The main valve 100 is coupled to the piston rod 20. Specifically, the piston rod 20 is coupled through the main valve 100. As described above, the main valve 100 coupled to the piston rod 20 divides the inner space of the cylinder 10 into the tension chamber 11 and the compression chamber 12.

A fluid is filled in the inner space of the cylinder 10, a portion is filled in the tension chamber 11, and a portion is filled in the compression chamber 12.

Since the main valve 100 is coupled to the piston rod 20, it reciprocates inside the cylinder 10 in association with the compression and tension strokes of the piston rod 20.

When the main valve 100 performs a compression stroke moving toward the compression chamber 12, the fluid stored in the compression chamber 12 flows into the tension chamber 11. Conversely, when the main valve 100 performs a tension stroke moving toward the tension chamber 11, the fluid stored in the tension chamber 11 flows into the compression chamber 12.

For the flow of the fluid, a flow path through which the fluid may flow is formed in the main valve 100. Specifically, a compression flow path 110 and a tension flow path 120 are formed in the main valve 100. The compression flow path 110 and the tension flow path 120 are formed through the main valve 100 in the longitudinal direction.

The main valve 100 is linked to the piston rod 20 to generate a damping force by the resistance of the fluid during compression stroke and tension stroke inside the cylinder 10.

Specifically, when the main valve 100 performs a compression stroke, the volume of the tension chamber 11 increases while the volume of the compression chamber 12 decreases. Accordingly, the pressure in the compression chamber 12 rises. In this process, the main valve 100 may be opened while the fluid filled in the compression chamber 12 passes through the compression flow path 110 of the main valve 100. The fluid that opens the main valve 100 flows into the tension chamber 11 to generate a damping force.

Conversely, when the main valve 100 performs a tension stroke, the volume of the compression chamber 12 increases while the volume of the tension chamber 11 decreases. Accordingly, the pressure of the tension chamber 11 increases. In this process, the fluid filled in the tension chamber 11 may open the main valve 100 while passing through the tension flow path 120 of the main valve 100. The fluid that opens the main valve 100 flows into the compression chamber 12 to generate a damping force.

On the other hand, since the vehicle does not always travel only on a flat road, a large impact of a large vibration or a small impact of a small vibration acts on the vehicle while driving. The large impact of vibration on the vehicle is called low frequency. The small impact of small vibrations on the vehicle is called high frequency.

As such, when a low frequency or a high frequency is applied to the vehicle, it is not easy for the shock absorber to generate an appropriate damping force only with the main valve 100. When low frequency or high frequency is applied, it is necessary to properly generate a damping force or reduce the generated damping force to improve the ride comfort and steering stability of the vehicle. However, it is not easy to expect this effect only with the main valve 100.

Accordingly, in the present disclosure, it is possible to implement a shock absorber that is sensitive to a low plate or a high frequency by providing the vibration control device.

The vibration control device is provided at the lower end of the piston rod 20. As described above, the vibration control device includes the sub-piston rod 200, the pilot valve unit 300, and the fixing member 400.

The sub-piston rod 200 is coupled to the lower end of the piston rod 20, and the fluid is transmitted from the piston rod 20. The sub-piston rod 200 includes a head portion 210 and a rod body portion 230.

The head portion 210 is a side to which the lower end of the sub-piston rod 20 is coupled. The head portion 210 is formed in a circular or polygonal column shape in cross section. The head portion 210 is formed with a rod insertion groove 211 into which the lower end of the piston rod 20 is inserted. The rod insertion groove 211 is formed to be concave by a set depth from the upper side to the lower side.

The rod body 220 is formed to extend from a lower side of the head portion 210 in a direction parallel to the longitudinal direction of the piston rod 20. The rod body 220 is formed in a circular or polygonal column shape in cross section. However, the size of the cross-section of the rod body 220 is formed smaller than the size of the cross-section of the head portion 210.

The sub-piston rod 200 further includes a second fluid flow path 230 and a fluid discharge path 240. The second fluid flow path 230 is formed to extend from the rod insertion groove 211 by a predetermined length along the longitudinal direction of the rod body 220. The second fluid flow path 230 is connected to the first fluid flow path 23. In other words, the fluid flowing along the first fluid flow path 23 flows along the second fluid flow path 230.

The fluid discharge path 240 is formed at a position spaced apart from the rod insertion groove 211 by a set length. The fluid discharge path 240 is formed to pass through in a direction crossing the longitudinal direction of the rod body 220 and is connected to the second fluid flow path 230.

The fluid flows along the second fluid flow path 230 and is discharged from the fluid discharge path 240 to the pilot valve unit 300.

The pilot valve unit 300 is through-coupled to the sub-piston rod 200. In the pilot valve unit 300, a pressure is formed by the fluid introduced through the sub-piston rod 200. The pilot valve unit 300 is to generate a damping force or decrease the damping force through the pressure formed by the fluid. In particular, the generation or decrease of the damping force by the pilot valve unit 300 depends on the frequency, which will be described in more detail later.

The pilot valve unit 300 includes a first pilot valve body 310, a second pilot valve body 320, a pilot valve 330, and a free piston 340.

The first pilot valve body 310 is through-coupled to the sub-piston rod 200. Pilot chambers are formed at upper and lower sides of the first pilot valve body 310 to be filled with fluid flowing through the piston rod 20 and the sub-piston rod 200.

More specifically, the first pilot valve body 310 includes a first lower surface 311, a first upper surface 312 spaced upward by a predetermined distance from the first lower surface 311, and the first It consists of a first side surface 313 connecting the lower surface 311 and the first upper surface 312.

The pilot chamber includes a first pilot chamber 314 formed on the first lower surface 311 and a second pilot chamber 315 formed on the first upper surface 312.

The first pilot chamber 314 is concave by a predetermined depth in a direction from the first lower surface 311 toward the first upper surface 312. The second pilot chamber 315 is concave by a predetermined depth in a direction from the first upper surface 312 toward the first lower surface 311.

The first pilot valve body 310 includes a partition surface 316 formed by the first pilot chamber 314 and the second pilot chamber 315 by a predetermined thickness. A plurality of fluid flow paths 316a spaced apart by a set angle along the circumferential direction are formed on the partition surface 316.

The fluid introduced into the pilot valve unit 300 fills the first pilot chamber 314 and also fills the second pilot chamber 315 through the fluid flow paths 316a.

The second pilot valve body 320 is located below the first pilot valve body 310. The second pilot valve body 320 is through-coupled to the sub-piston rod 200. The second pilot valve body 320 has a main chamber 324 filled with the fluid introduced through the piston rod 20 and the sub-piston rod 200.

Specifically, the second pilot valve body 320 has a second lower surface 321, a second upper surface 322 spaced apart from the second lower surface 321 by a predetermined distance, and a second side surface 323 connecting with the second upper surface 322 and the second lower surface 321.

The main chamber 324 is formed by a predetermined depth in a direction from the second upper surface 322 toward the second lower surface 321.

The fluid introduced through the sub-piston rod 200 not only flows into the first pilot chamber 314 but also flows into the main chamber 324. However, the amount of fluid introduced into the first pilot chamber 314 and the amount and velocity of the fluid introduced into the main chamber 234 vary depending on the frequency.

The pilot valve 330 is located between the first pilot valve body 310 and the second pilot valve body 320. The pilot valve 330 is elastically deformed according to a change in pressure formed by the fluid flowing into the first pilot valve body 310 and the second pilot valve body 320. Therefore, the pilot valve 330 is formed of a rubber material or a synthetic resin material.

The pilot valve 330 includes a flat portion 331 and a side portion 332. The flat portion 331 is circular or polygonal and is formed in the form of a flat plate having a set thickness. The side surface portion 332 extends in a direction intersecting with the flat portion 331 from either one surface or the other surface of the flat portion 331 and is formed along the circumferential direction of the flat portion 331.

The pilot valve 330 is provided in the first pilot chamber 314 and is located between the first pilot valve body 310 and the second pilot valve body 320.

The side portion 332 of the pilot valve 330 faces the first pilot chamber 314, and the flat portion 331 of the pilot valve 330 is configured to contact with a third upper surface 322 of the second pilot valve body 320.

Meanwhile, an inlet disk 350 is provided between the first pilot valve body 310 and the pilot valve 330. An inlet slit 351 is formed in the inlet disk 350. Accordingly, the fluid transferred through the piston rod 20 and the sub-piston rod 200 flows into the first pilot chamber 314 through the inlet slit 351.

The free piston 340 is provided in the second pilot chamber 315.

The free piston 340 includes a piston body 341. The piston body 341 includes a third lower surface 341a, a third upper surface 341b spaced apart from the third lower surface 341a by a predetermined distance, and a third side 341c connecting the third lower surface 341a and the third upper surface 341b.

The free piston 340 includes a piston chamber 342 concave by a set depth in a direction from the third upper surface 341b to the third lower surface 341a.

The free piston 340 further includes a support protrusion 343. The support protrusion 343 protrudes from the second upper surface 341*b* by a set height, and is formed along the circumferential direction of the free piston 340.

One or more disks are provided above the free piston 340 to correct a gap between the pilot valve unit 300 and the sub-piston rod 200. At this time, the disk in contact with the free piston 340 is provided in contact with the support protrusion 343.

A disk provided in contact with the support protrusion 343 is referred to as an outlet disk 360. A discharge slit 361 is formed in the outlet disk 360. The fluid filled in the piston chamber 315 may be discharged to the compression chamber 12 of the cylinder 10 through the discharge slit 361.

The free piston 340 includes a sealing member groove 344 and a sealing member 345. The sealing member groove 344 is concave in the second side surface 341*c* by a predetermined depth, and is formed along the circumferential direction of the free piston 340. The sealing member 345 is provided as an exemplary O-ring, and is inserted into the sealing member groove 344.

When the free piston 340 is provided in the second pilot chamber 315, the sealing member 345 prevents the fluid filled in the second pilot chamber 315 from being lost to the cylinder 10.

The free piston 340 includes a pressure control hole 346. The pressure control hole 346 is formed at any one position of the piston body 341 to pass through the second lower surface 341*a* and the second upper surface 341*b*. As the pressure control hole 346 is formed in the free piston 340, the second pilot chamber 315 may be well filled with a fluid. In addition, the fluid filled in the second pilot chamber 315 flows to the piston chamber 342 through the pressure control hole 346 to fill the piston chamber 342 with the fluid.

The fixing member 400 is provided below the second pilot valve body 320. The fixing member 400 is coupled through the sub-piston rod 200 to fix the pilot valve unit 300.

Hereinafter, a state when the frequency-sensitive shock absorber having the above-described configuration operates according to the frequency will be described.

An operating state of the frequency-sensitive shock absorber will be described with reference to FIGS. 4 to 8.

First, when the frequency-sensitive shock absorber performs a compression stroke regardless of the frequency, the fluid filled in the compression chamber 12 passes through the compression flow path 110 of the main valve 100 to the tension chamber 11 flows. As the fluid flows into the tension chamber 11, a damping force is generated. In addition, when the tension stroke is performed regardless of the frequency, the fluid filled in the tension chamber 11 passes through the tension flow path 120 of the main valve 100 and flows into the compression chamber 12. As the fluid flows into the compression chamber 12, a damping force is generated.

Meanwhile, when the frequency-sensitive shock absorber performs a low-frequency tensile stroke, not only a damping force through the main valve 100 but also a damping force by the pilot valve unit 300 is generated.

Figure 5:
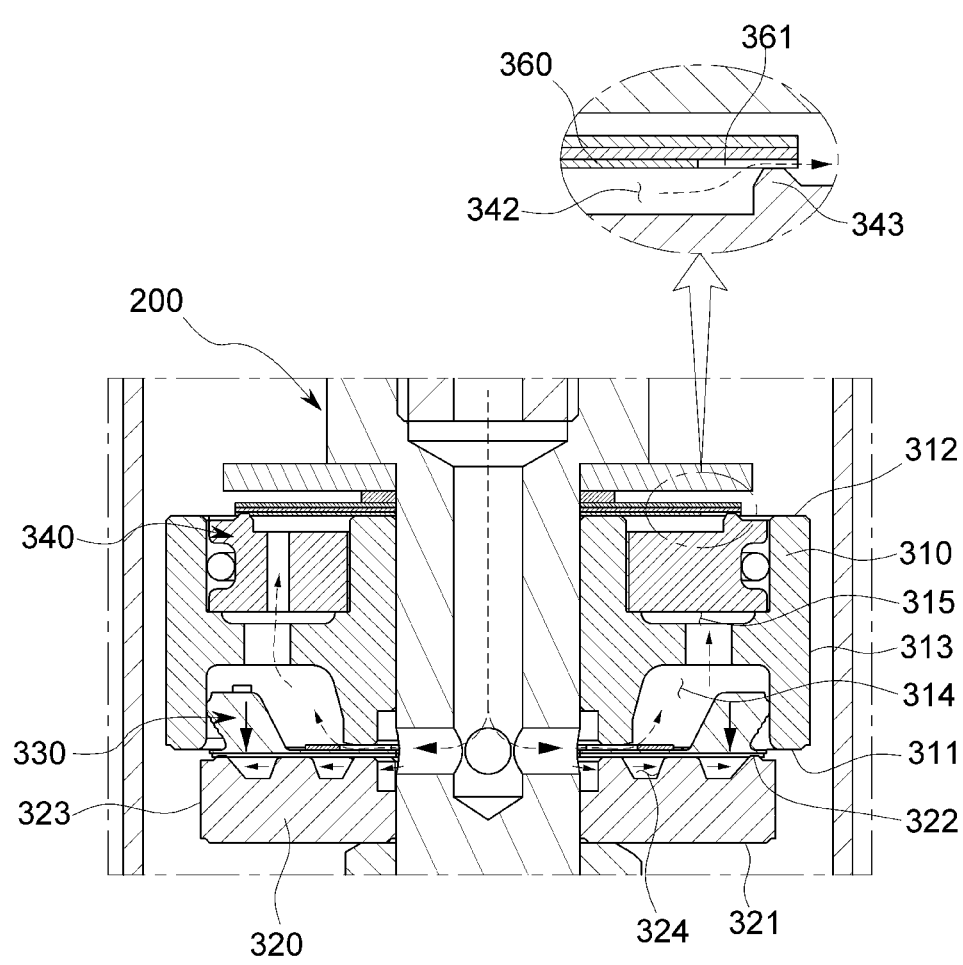

Referring to FIG. 5, the fluid filled in the tension chamber 11 flows into the pilot valve unit 300 through the fluid inflow path 21 and the first fluid flow path 23 formed in the piston rod 20, and the second fluid flow path 213 and the fluid discharge path 215 formed in the sub-piston rod 200.

The fluid flowing into the first pilot valve body 310 flows through the inlet slit 351 of the inlet disk 350, but during a low-frequency tension stroke where a large impact of great vibration acts on the vehicle, the first pilot valve The fluid is smoothly introduced into the body 310.

Accordingly, the pressure formed in the first pilot chamber 314 and the second pilot chamber 315 and the pressure formed in the main chamber 324 are balanced. At this time, the flat portion 331 of the pilot valve 330 is in close contact with the third upper surface 322 of the second pilot valve body 320, so that the fluid filled in the main chamber 324 is transferred to the cylinder 10 to prevent leakage into the compression chamber 12.

In addition, when the flow rate of the fluid increases when the low-frequency tension stroke is continued, the pressure formed in the first pilot valve body 310 also increases. In this case, the fluid in the piston chamber 342 is discharged to the compression chamber 12 of the cylinder 10 through the discharge slit 361 of the outlet disk 360 provided above the free piston 340. Accordingly, the pressure balance between the first pilot valve body 310 and the second pilot valve body 320 is maintained, and the damping force generated by the pilot valve unit 300 is also maintained.

Figure 9:
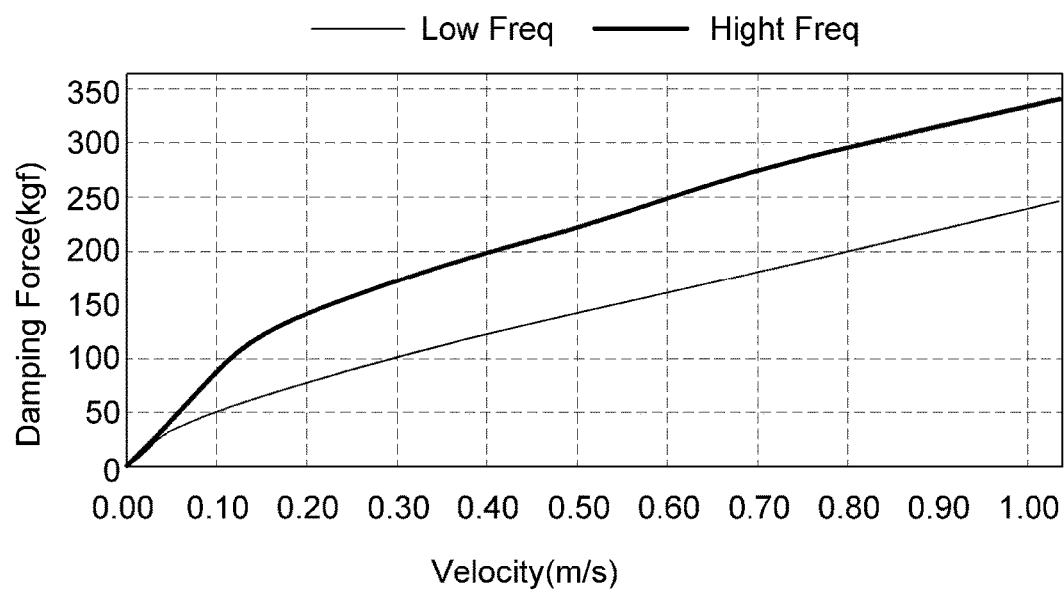
FIG. 9 is a graph illustrating damping force during a low-frequency stroke and a high-frequency stroke.

Further, as shown in FIG. 9, the frequency-sensitive shock absorber according to the present disclosure generates damping force when performing a low-frequency tensile stroke even in a low-speed driving section to prevent deterioration of handling.

Figure 6:
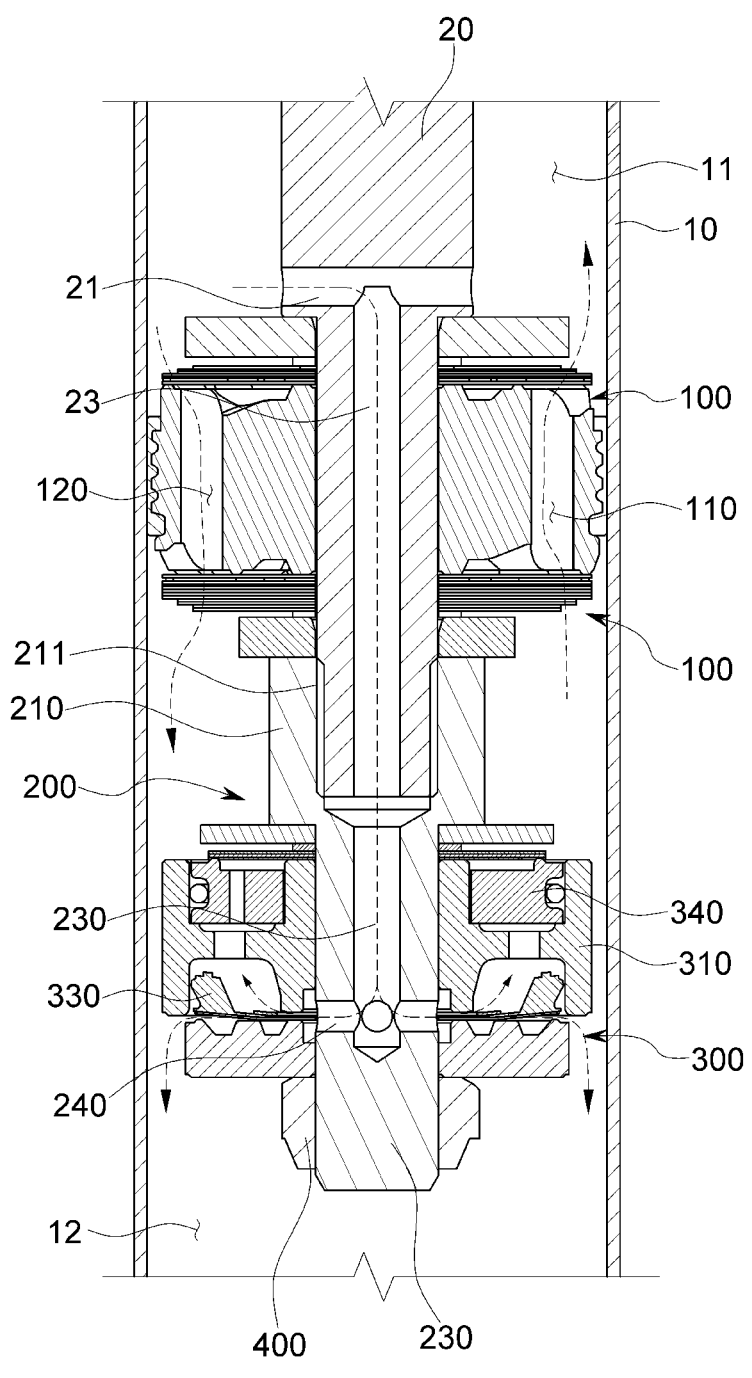
FIGS. 6 to 8 are diagrams illustrating a fluid flow during a high-frequency stroke of a frequency-sensitive shock absorber and a fluid flow in a pilot valve unit according to an example embodiment.
Figure 7:
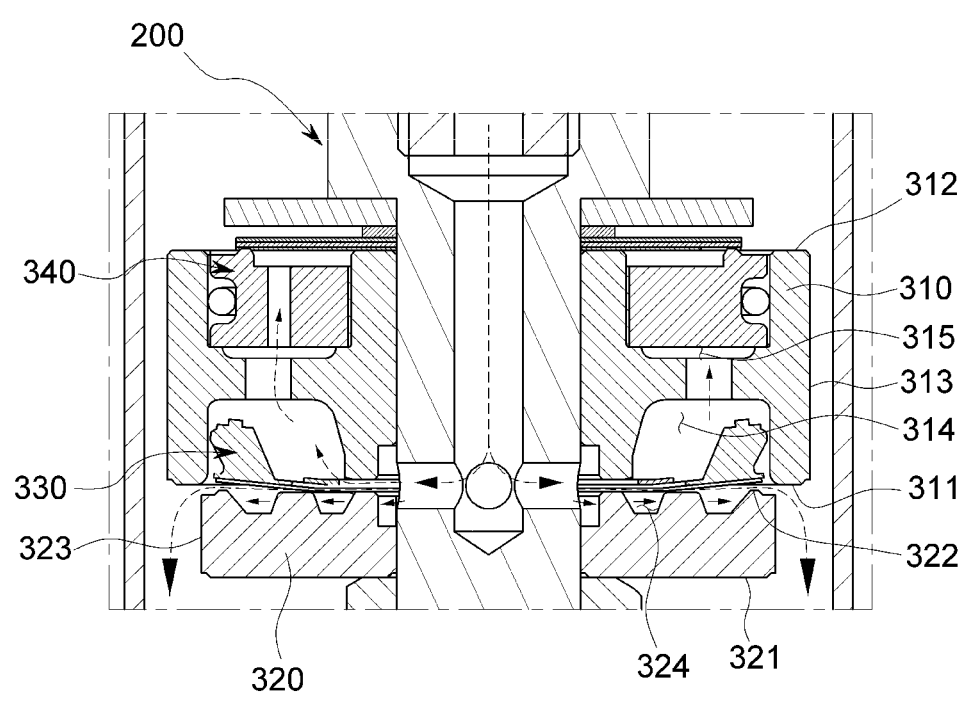
Figure 8:
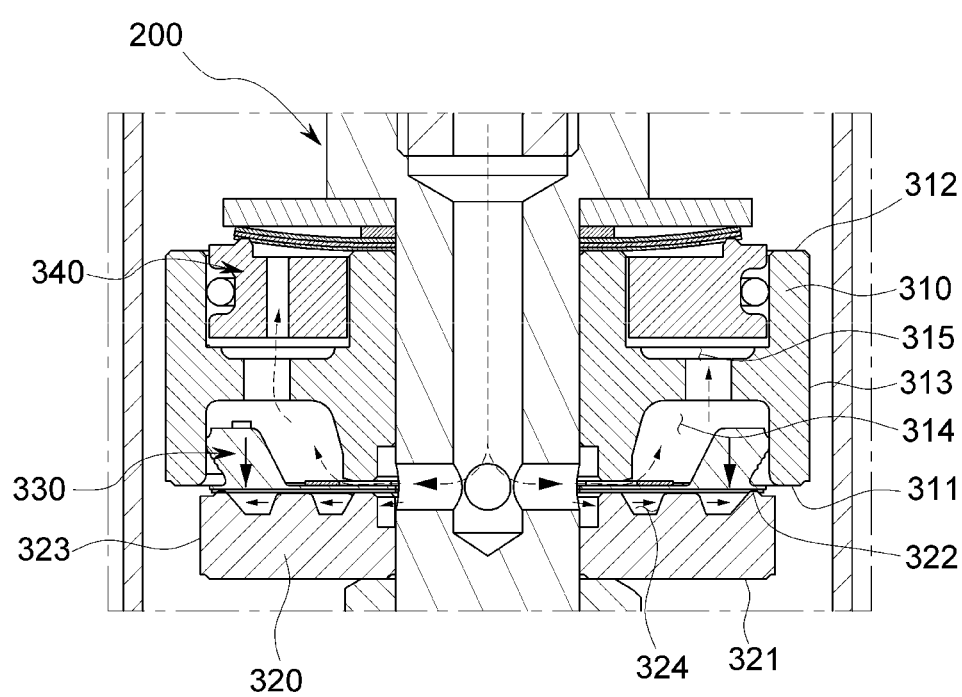

FIGS. 6 to 8 illustrate the operating state of the frequency-sensitive shock absorber during the high-frequency tensile stroke. In the frequency-sensitive shock absorber, a damping force is reduced by the pilot valve unit 300 when a high-frequency tensile stroke is performed.

As described above, since fluid flows into the first pilot valve body 310 through the inlet slit 351 of the inlet disk 350, during the high-frequency tension stroke in which a small impact of small vibration acts on the vehicle, the first The fluid does not fill the pilot valve body 310 well.

Accordingly, while the pressure of the main chamber 324 filled with the fluid first increases, the pressure of the first pilot chamber 314 and the second pilot chamber 315 is not as high as that of the main chamber 324. In other words, a pressure imbalance occurs between the first pilot valve body 310 and the second pilot valve body 320.

As the pressure of the main chamber 324 is greater than that of the first pilot chamber 314 and the second pilot chamber 315, the pilot valve 330 is elastically deformed.

Specifically, the flat portion 331 of the pilot valve 330 is spaced apart from the third upper surface 322 of the second pilot valve body 320 to open the main chamber 324. Due to this, the fluid filled in the main chamber 324 is discharged to the pressure chamber 12 of the cylinder 10, and the damping force is reduced.

Meanwhile, as the fluid from the main chamber 324 is discharged, the pressure of the first pilot valve body 310 may relatively increase. At this time, as the free piston 340 rises, the volumes of the first pilot chamber 314 and the second pilot chamber 315 are increased. Thus, the pressure formed in the first pilot valve body 310 is adjusted not to be greater than the pressure of the second pilot valve body 320.

In addition, it has the effect of improving the riding comfort by reducing the damping force during the high-frequency tensile stroke.

Further, as shown in FIG. 9, the frequency-sensitive shock absorber according to the present disclosure can improve riding comfort by reducing the damping force during the high-frequency tensile stroke even in the middle and high-speed driving section.

The vibration control device according to the present disclosure and the frequency-sensitive shock absorber having the same have the effect of reducing cost and improving durability at the same time by having a free piston in particular.

In particular, in a related art, a pilot valve was also provided in the second pilot chamber. As an inner diameter portion of the pilot valve was fixed by axial force and its flat portion was bent, the pilot valve secured the volume of the second pilot chamber. However, there were issues in that a sufficient volume of the second pilot chamber was not secured only by bending the flat portion and the flat portion was damaged by repeated bending.

However, in the present disclosure, since the free piston is provided in the second pilot chamber so that the second pilot chamber may move in the vertical direction without being affected by the axial force, it is possible to secure more volume and improve durability.

Although example embodiments have been described above with reference to the accompanying drawings, those skilled in the art to which the present disclosure pertains can understand that the present disclosure may be embodied in other specific forms without changing the technical spirit or essential characteristics thereof.

Therefore, the example embodiments described above are to be understood as illustrative and not restrictive in all respects, and the scope of the present disclosure is indicated by the following claims, and from the meaning and scope of the claims and their equivalents. All derived changes or modifications should be construed as being included in the scope of the present disclosure.

EXPLANATION OF REFERENCE NUMERALS

10: Cylinder
11: Tension chamber
12: Compression chamber
20: Piston rod
21: Fluid inflow path
23: First fluid flow path
100: Main valve
110: Compression flow path
120: Tension flow path
200: Sub-piston rod
210: Head portion
211: Rod insertion groove
220: Rod body portion
230: Second fluid flow path
240: Fluid discharge path
300: Pilot valve unit
310: First pilot valve body
314: First pilot chamber
315: Second pilot chamber
320: Second pilot valve body
324: Main chamber
330: Pilot valve
340: Free piston
400: Fixing member

What is claimed is:

1. A vibration control device comprising:
a sub-piston rod coupled to an end of a piston rod;
a pilot valve unit penetrated by and coupled to the sub-piston rod, in which pressure is formed by a fluid introduced through the sub-piston rod; and
a fixing member located in a lower portion of the pilot valve unit and fastened to the sub-piston rod to fix the pilot valve unit,
wherein the pilot valve unit comprises a free piston provided to reciprocate in a vertical direction according to a change in the pressure formed by the fluid,
wherein the pilot valve unit further comprises:

a first pilot valve body penetrated by and coupled to the sub-piston rod and having pilot chambers formed at upper and lower sides to be filled with the fluid flowing through the sub-piston rod;
a second pilot valve body located below the first pilot valve body and penetrated by and coupled to the sub-piston rod, and having a main chamber to be filled with the fluid flowing through the sub-piston rod; and
a pilot valve located between the first pilot valve body and the second pilot valve body and elastically deformed according to a pressure change formed by the fluid in the first pilot valve body and the second pilot valve body,
wherein the first pilot valve body comprises a first lower surface, a first upper surface spaced apart from the first lower surface by a predetermined distance, and a first side surface connecting the first lower surface and the first upper surface, and
the pilot chamber comprises:
a first pilot chamber concaved by a predetermined depth in a direction from the first lower surface toward the first upper surface; and
a second pilot chamber concaved by a predetermined depth in a direction from the first upper surface toward the first lower surface,
wherein an entirety of the free piston is provided in the second pilot chamber,
wherein the first pilot valve body comprises a partition surface formed by a predetermined thickness by the first pilot chamber and the second pilot chamber, and
a fluid flow path is formed in the partition surface to pass through along a vertical direction so that the fluid introduced into the first pilot chamber flows into the second pilot chamber,
wherein the pilot valve unit further comprises an outlet disk provided on an upper side of the free piston, and the outlet disk is configured to contact the first upper surface of the first pilot valve body and a support protrusion of the piston body to shield the piston chamber,
wherein a discharge slit is formed in the outlet disk to discharge the fluid of the piston chamber when pressure of the first pilot chamber and pressure of the second pilot chamber are unbalanced, and
wherein the support protrusion extends into the discharge slit.

2. The vibration control device of claim 1, wherein the free piston comprises:
a piston body comprising a third lower surface, a third upper surface spaced apart from the third lower surface by a predetermined distance, and a third side surface connecting the third lower surface and the third upper surface; and
a piston chamber concaved by a predetermined depth in a direction from the third upper surface toward the third lower surface.

3. The vibration control device of claim 2, wherein the free piston further comprises the support protrusion formed to protrude from the third upper surface by a predetermined height.

4. The vibration control device of claim 2, wherein the free piston further comprises:
a sealing member groove concaved to a predetermined depth on the third side surface and formed along a circumferential direction; and
a sealing member provided in the sealing member groove.

5. The vibration control device of claim 1, wherein the free piston further comprises a pressure control hole formed to pass through in the vertical direction at any one position of the piston body.

6. The vibration control device of claim 5, wherein the fluid filled in the second pilot chamber flows to the piston chamber through the pressure control hole.

7. The vibration control device of claim 1, wherein, when the pressure formed in the first pilot chamber and the pressure formed in the second pilot chamber rise higher than pressure formed in the main chamber during a low-frequency tension stroke, the pressure of the pilot valve unit is adjusted as the fluid in the piston chamber is discharged through the discharge slit.

8. The vibration control device of claim 1, wherein, when the pressures formed in the first pilot chamber and the pressure formed in the second pilot chamber rise during a high-frequency tension stroke, the pressure of the pilot valve unit is adjusted as the free piston moves in an upward direction.

9. A frequency-sensitive shock absorber comprising:

a cylinder having a fluid stored in its inner space;

a piston rod having a part coupled to be located inside the cylinder and reciprocating along a longitudinal direction of the cylinder;

a main valve unit coupled to the piston rod and partitioning the inner space of the cylinder into a compression chamber and a tension chamber;

a sub-piston rod coupled to a lower end of the piston rod and into which a fluid is introduced from the piston rod;

a pilot valve unit penetrated by and coupled to the sub-piston rod, in which pressure is formed by the fluid introduced through the sub-piston rod; and a fixing member located below the pilot valve unit and fastened to the sub-piston rod to fix the pilot valve unit, wherein the pilot valve unit comprises a free piston configured to reciprocate in a vertical direction according to a pressure change formed by the fluid, wherein the pilot valve unit further comprises:

a first pilot valve body penetrated by and coupled to the sub-piston rod and having pilot chambers formed at upper and lower sides to be filled with the fluid flowing through the sub-piston rod;

a second pilot valve body located below the first pilot valve body and penetrated by and coupled to the sub-piston rod, and having a main chamber to be filled with the fluid flowing through the sub-piston rod; and a pilot valve located between the first pilot valve body and the second pilot valve body and elastically deformed according to a pressure change formed by the fluid in the first pilot valve body and the second pilot valve body, wherein the first pilot valve body comprises a first lower surface, a first upper surface spaced apart from the first lower surface by a predetermined distance, and a first side surface connecting the first lower surface and the first upper surface, and the pilot chamber comprises:

a first pilot chamber concaved by a predetermined depth in a direction from the first lower surface toward the first upper surface; and a second pilot chamber concaved by a predetermined depth in a direction from the first upper surface toward the first lower surface, wherein an entirety of the free piston is provided in the second pilot chamber, wherein the first pilot valve body comprises a partition surface formed by a predetermined thickness by the first pilot chamber and the second pilot chamber, and a fluid flow path is formed in the partition surface to pass through along a vertical direction so that the fluid introduced into the first pilot chamber flows into the second pilot chamber, wherein the pilot valve unit further comprises an outlet disk provided on an upper side of the free piston, and the outlet disk is configured to contact the first upper surface of the first pilot valve body and a support protrusion of the piston body to shield the piston chamber, wherein a discharge slit is formed in the outlet disk to discharge the fluid of the piston chamber when pressure of the first pilot chamber and pressure of the second pilot chamber are unbalanced, and wherein the support protrusion extends into the discharge slit.

10. The frequency-sensitive shock absorber of claim 9, wherein the free piston comprises:

a piston chamber formed on an upper side; and a pressure control hole formed through in the vertical direction.

11. The frequency-sensitive shock absorber of claim 9, wherein, when pressure formed in the first pilot chamber and the second pilot chamber rises higher than pressure formed in the main chamber during a low-frequency tensile stroke, the pressure of the pilot valve unit is adjusted as the fluid of the piston chamber is discharged.

12. The frequency-sensitive shock absorber of claim 9, wherein, when pressure formed in the first pilot chamber and the second pilot chamber rises during a high-frequency tensile stroke, the pressure of the pilot valve unit is adjusted as the free piston moves in an upward direction.

\* \* \* \* \*